United States Patent [19]

Brown

[11] Patent Number: 4,464,495

[45] Date of Patent: Aug. 7, 1984

[54] SMOKE RETARDANT VINYL HALIDE POLYMER COMPOSITIONS

[75] Inventor: Randall J. Brown, Sheffield Lake, Ohio

[73] Assignee: The B. F. Goodrich Company, Akron, Ohio

[21] Appl. No.: 378,378

[22] Filed: May 14, 1982

[51] Int. Cl.$^3$ ............................ C08K 5/34; C09K 3/28
[52] U.S. Cl. ...................................... 524/87; 252/609; 252/601; 524/99; 524/100
[58] Field of Search ...................... 252/609, 607, 608; 524/204, 87, 100, 99; 521/903

[56] References Cited

U.S. PATENT DOCUMENTS

| | | | |
|---|---|---|---|
| 3,522,331 | 7/1970 | Dever et al. | 252/609 |
| 4,053,453 | 10/1977 | McRowe et al. | 524/204 |
| 4,129,540 | 12/1978 | Kroenke | 524/204 |
| 4,153,792 | 5/1979 | Kroenke | 524/204 |
| 4,174,223 | 11/1979 | Steen | 252/607 |
| 4,234,473 | 11/1980 | Kroenke | 524/204 |
| 4,234,474 | 11/1980 | Kroenke | 524/204 |
| 4,240,955 | 12/1980 | Kroenke | 524/204 |
| 4,243,579 | 1/1981 | Keogh | 252/609 |
| 4,265,806 | 5/1981 | Grundmann et al. | 252/606 |

FOREIGN PATENT DOCUMENTS

| | | | |
|---|---|---|---|
| 141471 | 5/1980 | Fed. Rep. of Germany | 252/609 |
| 37159 | 8/1977 | Japan | 252/609 |
| 138821 | 10/1980 | Japan | 252/609 |

*Primary Examiner*—Leland A. Sebastian
*Assistant Examiner*—Howard J. Locker
*Attorney, Agent, or Firm*—J. Hughes Powell, Jr.; Alan A. Csontos

[57] ABSTRACT

Improved vinyl halide polymer compositions containing smoke retarding amounts of copper oxalate and an amine molybdate form less smoke and have decreased flame spread on burning in the ASTM E-84 test when the compositions also contain about 5 to 15 weight parts of a Group IIA alkaline earth metal carbonate, titanium dioxide and alumunim hydrate. Improved rigid vinyl halide polymer compositions, substantially free of liquid ester type plasticizers, also containing styrene copolymer process modifiers, copolymers of ethylene and vinyl acetate and graft copolymers of methacrylates, butadiene, and styrenes (MBS) polymers, are disclosed.

10 Claims, No Drawings

SMOKE RETARDANT VINYL HALIDE POLYMER COMPOSITIONS

BACKGROUND OF THE INVENTION

Polyvinyl chloride is inherently difficult to ignite. When ignited polyvinyl chloride burns only with difficulty compared with other polymers. Therefore, polyvinyl chloride has been widely used where fire safety is important. An important fire safety concern is that of smoke and gas emission when a polymer is forced to burn. U.S. Pat. No. 4,053,453 discloses rigid vinyl halide polymer compositions containing copper oxalate and amine molybdates that suppress smoke formation when such polymers burn as determined in the NBS Smoke Chamber (ASTM STP 422). However, as determined in the more rigorous Surface Burning Characteristics Of Building Materials test, (ASTM E-84) compounds are desired that suppress flame spread and smoke formation even further, particularly in thicker sections.

SUMMARY OF THE INVENTION

Vinyl halide polymer compositions containing smoke retarding amounts of copper oxalate and an amine molybdate form less smoke on burning and have decreased flame spread in the ASTM E-84 (Tunnel) Test when such compositions also contain 5 to 15 weight parts each of a Group IIA, of the Periodic Chart, alkaline earth metal carbonate, titanium dioxide and aluminim hydrate.

DETAILED DESCRIPTION

The vinyl halide polymers used in this invention include homopolymers, copolymers and blends of homopolymers and/or copolymers. Useful vinyl halides include vinyl chloride and vinylidene chloride polymers that contain up to about 50% by weight of at least one other olefinically unsaturated monomer, more preferably at least one other vinylidene monomer (i.e., a monomer containing at least one terminal $CH_2=C<$ group per molecule) copolymerized therewith, even more preferably up to about 20% by weight of such monomers. Suitable comonomers include -olefins containing from 2 to 12 carbon atoms, more preferably from 2 to 8 carbon atoms, such as ethylene, propylene, 1-butene, isobutylene, 1-hexene, 4-methyl-1-pentene and the like; dienes containing from 4 to 10 carbon atoms including conjugated dienes as butadiene, isoprene, piperylene and the like; ethylidene norborene and dicyclopentadiene; vinyl esters and allyl esters such as vinyl acetate, vinyl chloroacetate, vinyl propionate, vinyl butyrate, vinyl laurate, vinyl benzoate, allyl acetate and the like; vinyl aromatics such as styrene, $\alpha$-methyl styrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as $\beta$-cyanomethyl acrylate, the $\alpha$-, $\beta$- and $\gamma$-cyanopropyl acrylates and the like; olefinically unsaturated carboxylic acids and esters thereof, including $\alpha,\beta$-olefinically unsaturated acids and esters thereof such as acrylic acid, methacrylic acid, ethacrylic acid, methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethooxyethyl acrylate, hexylthioethyl acrylate, methylmethacrylate, ethyl methacrylate, butyl methacrylate, glycidyl methacrylate and the like wherein the alkyl groups contain 1 to 12 carbon atoms, and including esters of maleic and fumaric acid and the like; amides of the $\alpha,\beta$-olefinically unsaturated carboxylic acids such as acrylamide, methacrylamide, and the like; divinyls, diacrylates and other polyfunctional monomers such as divinyl benzene, divinyl ether, diethylene glycol diacrylate, ethylene glycol dimethacrylate, methylenebis-acrylamide, allyl pentaerythritol, and the like; and bis(-haloalkyl)alkenyl phosphonates such as bis($\beta$-chloroethyl)vinyl phosphonate and the like.

A group of particularly useful comonomers include 1-olefins containing from 2 to 8 carbon atoms; vinyl esters and allyl esters; olefinically unsaturated carboxylic acids and esters thereof, especially $\alpha,\beta$-olefinically unsaturated acids and esters thereof; esters of maleic and fumaric acid and the like; amides of $\alpha,\beta$-olefinically unsaturated carboxylic acids; and vinylidene or vinyl chloride.

The term vinyl chloride polymer includes chlorinated and chlorosulfonated derivatives of the vinyl chloride polymers described hereinabove. Methods for chlorinating polyvinyl chloride (PVC) polymers are well known. U.S. Pat. Nos. 2,996,489 and 3,167,535 disclose chlorination in organic liquids; while U.S. Pat. No. 4,039,732 describes a gas phase chlorination process. Normally the PVC is chlorinated until it contains about 65 to 70 weight percent chlorine, although the chlorine content may be as high as about 73 percent, or lightly chlorinated, as desired. In any event, the compositions of this invention include chlorinated and chlorosulfonated vinyl chloride polymers compounded with copper oxalate, an amine molybdate, the alkaline earth metal carbonate, titanium dioxide and aluminum hydrate.

These vinyl chloride polymers normally are high molecular weight polymers having a specific viscosity greater than 0.2 measured as a 0.4% solution in nitrobenzene.

The vinyl chloride polymers may be prepared by any method known to the art as by emulsion, suspension, bulk or solution polymerization. The additive compounds may be mixed with the polymer emulsion, suspension, solution or bulk mass before monomer recovery and/or drying. More preferably the compounds are mixed with dry granular or powdered polymers. The polymers and compounds may be mixed thoroughly in granular or powdered form in apparatus such as a Henschel mixer or the like. Alternatively, this step may be eliminated and the mixing done while the polymer mass is fluxed, fused and masticated to homogeneity under fairly intensive shear in or on a mill or internal mixer apparatus having its metal surface in contact with the material. The vinyl chloride polymers may also be mixed with standard compounding ingredients known to those skilled in the art, including plasticizers, lubricants, stabilizers, fillers, colorants, processing aids, and the like.

The copper oxalate and amine molybdates are normally used in powder form in amounts greater than about 0.1 weight part total per 100 weight parts of vinyl halide polymer, more preferably from about 1 to about 20 total weight parts per 100 weight parts of vinyl chloride polymers. From about 1 to about 10 total weight parts is a very practical range providing a good balance of desirable properties in the compounds. The useful ratio of copper oxalate to amine molybdate is from about 1:10 to 10:1 on a weight basis. The copper oxalate and amine molybdate are readily mixed with the vinyl chloride polymers in powder form.

Any amine molybdate may be used. Typical amine molybdates are described in U.S. Pat. No. 4,053,455. Amine molybdates are typically produced by reacting an amine with $MoO_3$, molybdic acid or a molybdenum salt such as ammonium molybdate, ammonium dimolybdate, ammonium heptamolybdate (also known as ammonium paramolybdate), ammonium octamolybdate, sodium molybdate or the like. Excellent results have been obtained using ammonium dimolybdate, ammonium heptamolybdate, sodium molybdate, and the commercial "molybdic acid" which primarily consists of one or more ammonium molybdates.

Amines suitable for preparing the organoamine molybdates used in this invention may contain from 1 to 40 carbon atoms and from 1 to 10 primary, secondary or tertiary amine groups or a mixture thereof; more preferably from 1 to 20 carbon atoms and 1 to 4 primary amines or heterocyclic secondary amine groups. Examples of amines include aliphatic, alicyclic, aromatic and heterocyclic amines. Aliphatic amines include ethylamine, ethylenediamine, 1,2-propanediamine, 1,7-heptanediamine, 1,8-octanediamine, 1,10-decanediamine, 1,12-dodecanediamine and the like. Also, aliphatic polyamines such as diethylenetriamine, triethylenetetramine, tetraethylenepentamine, bis(hexamethylene)triamine, 3,3'-iminobispropylamine, quanidine carbonate, and the like. Other suitable amines include alicyclic diamines and polyamines such as 1,2-diaminocyclohexane, 2',4-diamino-1-propyl-4-methylcyclohexane, and the like; aromatic amines as aniline, and maphthylamine; and heterocyclic amines such as melamine, N,N-dimethylaniline, pyridine, piperazine; hexamethylenetetraaime; 2,2,3-trimethyl decahydroquinoline, 2,4,6-tri(-morpholino)-1,3,5-triazine; and N-(aminoalkyl)-piperazines wherein each alkyl group contains from 1 to 12 carbon atoms, more preferably 1 to 6 carbon atoms, such as N-(2-aminoethyl)piperazine, and the like. Examples of suitable polymeric amines include polyethyleneimine, polyvinylpyridine, polyvinyl pyrrolidine, and poly(2,2,4-trimethyl-1,2-dihydroquin-olyl). Excellent results are obtained using melamine, piperazine, and alkyl amines wherein the alkyl contains 1 to 8 carbon atoms.

Useful melamine and substituted malemines have the formula

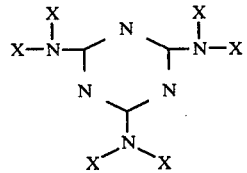

wherein X is hydrogen or an alkyl, alicyclic, aralkyl, alkaryl, aryl or heterocyclic group containing from 1 to 10 atoms of C, O, S and/or N. Two X's on each of one or more nitrogen atoms may also be joined together to form a heterocyclic ring such as a morpholino group in 2,4,6-tri(morpholino)-1,3,5-triazine. Other examples of suitable substituted melamines include N,N',N''-hexaethylmelamine; 2-anilino-4-(2',4'-dimethylanilino)-6-piperidino-1,3,5-triazine; and 2,4,6-tri-(N-methylanilino)-1,3,5-triazine. The amine molybdate normally contains from about 1 to 2 moles of molybdenum per mole of amine.

The amine molybdates used in this invention may be in the form of polycrystalline or amorphous fine powders. The amine molybdate and copper oxide may have an average particle size from about 0.01 to about 800 microns, more preferably from about 0.1 to about 200 microns, and even more preferably from about 0.5 to about 50 microns. Supports such as $SiO_2$, $Al_2O_3$ and the like may be used for the smoke retardant additives.

The alkaline earth metal carbonate, Group IIA of the Periodic Chart, includes for example calcium carbonate, magnesium carbonate, strontium carbonate and barium carbonate. The amount of carbonate, titanium dioxide and aluminum hydrate (aluminum hydroxide) used is about 5 to 15 weight parts each per one hundred weight parts of vinyl halide polymer. Use of about 6 to about 12 weight parts each provides a good balance of desirable properties in the composition. The carbonates, as calcium carbonate, titanium dioxide and aluminum hydrate are readily incorporated into the vinyl halide composition by any of the methods known and used by those skilled in the art. The $TiO_2$ and $Al(OH)_3$ additives are used in finely divided form. Typical particle size ranges are from about 0.001 to about 1000 microns. Larger particles may be used, but a convenient size distribution is about 0.01 to about 100 microns for $TiO_2$ and about 0.005 to about 200 microns for calcium carbonate. The additives may be added to the compounds on a mill, by powder mixing, in an internal mixer and the like.

Particularly useful rigid vinyl halide polymer compositions, substantially free of liquid ester type plasticizers, and containing the smoke suppressing copper oxalate and amine molybdate, and the alkaline earth metal carbonate, $TiO_2$ and $Al(OH)_3$ also contain styrene copolymer processing aids, and optionally, copolymers of ethylene and vinyl acetate and either graft copolymers of alkyl methacrylates, butadiene and styrenes (MBS), butyl acrylate polymers or graft ABS polymers. These later materials contribute to impact improvement.

The styrene copolymer processing aid may be made from monomers containing as two essential monomers, 50 to 90% by weight of styrene or a nuclear or alpha-substituted styrene such as chloro, alkyl, and alkoxy styrenes such as chlorostyrene, vinyl toluene, α-methyl styrene, methoxystyrene and the like, with from 10 to 50% by weight of an acrylicnitrile such as acrylonitrile, methacrylonitrile, ethacrylonitrile, and the like. Other vinylidene monomers containing at least one terminal $CH_2$ group may be included in amounts up to about 20% by weight of the total monomers. These polymers are described in U.S. Pat. No. 2,646,417. The styrenealkacrylate copolymers normally contain as two essential monomers, from 75 to 25 weight percent of styrene, a nuclear or -substituted derivative such as chlorostyrene, vinyl toluene, -methyl styrene, methoxystyrene and the like, and from 25 to 75 weight percent of an aliphatic alicyclic or aromatic methacrylate. Useful are alkyl methacrylates and ethacrylates wherein the alkyl group contains 1 to 8 carbon atoms, alicyclic methacrylates such as cyclohexyl methacrylate and the like, other vinylidene monomers containing at least terminal $CH_2<$ group in amounts up to 20 weight percent may be included. Normally the copolymer contains 60 to 40 weight percent styrene and 40 to 60 weight percent methyl methacrylate. Acrylate materials also may be used such as styrene copolymers of methyl methacrylate and ethyl methacrylate substituted for the styrene nitrile copolymers. These polymers generally have molecular weights above about 40,000. The amounts used are 1 to 10 weight parts per 100 weight parts of vinyl chloride polymer.

The MBS impact modifiers are alkyl alkacrylate equivalents of ABS (acrylonitrile, butadiene and styrene) graft polymers and are well known. These materials are readily prepared for example by grafting methyl methacrylate and styrene onto a butadiene-1,3 polymer substrate, which may be a copolymer of butadiene and a minor proportion of styrene. Other styrene derivatives such as α-methyl styrene, chlorostyrene, methoxy styrene and the like may be employed and other alkyl alkacrylates such as methyl methacrylate, ethyl methacrylate, methyl ethacrylate, butyl ethacrylate, and the like may be employed. Normally these butadiene polymers contain greater than 50 weight parts of butadiene with the remainder being from 0 weight parts to about 50 weight parts of a vinylidene monomer containing at least one terminal $CH_2>$ group, for example, 10 to 50 parts of styrene. At least part of the styrene and the alkyl alkacrylate are grafted onto the butadiene polymer substrate. Proportions of monomer can be from about 20 to 90% of methyl methacrylate and styrene with 80 to 10 parts of the diene substrate. The styrene is normally is the predominant monomer. More usually, the proportions are 30 to 60 of methyl methacrylate and styrene and 70 to 40 parts of butadiene polymer. A typical formulation would be polymerizing 20 parts of methyl methacrylate and 20 parts of styrene onto 60 parts of a copolymer of 75 parts of butadiene polymerized with 25 parts of styrene. Cross-linking agents may be used in either the substrate or in the graft polymerization stage, and such materials include for example diallyl acrylate, divinyl benzene and other well known difunctional cross-linking agents normally in amounts up to 2 weight parts per 100 of the other monomers. The MBS polymers are generally a mixture of the rubber particles dispersed in a styrene/methyl methacrylate matrix, the styrene and methyl methacrylate being grafted onto the elastomeric butadiene polymer substrate.

The ethylene-vinyl acetate (EVA) copolymers are well known and such copolymers prepared by methods known to those skilled in the art to contain from 5 to 60% of vinyl acetate copolymerized with ethylene.

The EVA and MBS may be advantageously used together. As to the proportion of EVA/MBS, excellent results have been obtained at 8:4, 7:3 and 6:2. Preferably of the two components there is used 60 to 80 weight percent EVA and 40 to 20 weight percent of MBS. Although improvement is observed when the mixture contains greater than 50 percent EVA, amounts larger than 90 weight percent are not desired. The total amount of the two modifiers used is an amount of at least 3 up to 15 weight parts per 100 weight parts of vinyl halide polymer, more preferably 6 to 12 weight parts. The process modifiers and impact improvers are readily mixed with the vinyl halide polymers, copper oxalate and amine molybdate, the IIA metal carbonate, $TiO_2$ and $Al(OH)_3$ by any of those techniques well known to those skilled in the art.

To demonstrate the practice of the invention and various embodiments thereof, a masterbatch compound was prepared using the following formulation: 100 weight parts of poly(vinylchloride) having an inherent viscosity (IV) of 0.9 measured by ASTM D1243-66; 2 weight parts of a copolymer of 78 weight percent styrene and 22 weight percent acrylonitrile, 1 weight part of a wax ester lubricant having an ASTM D566/49 drop point of 100°–105° C., a density of 20° C. of 1.01 to 1.03 and an ASTM D1387/55T saponification value of 100115 (American Hoechst), 1 weight part of saturated fatty acid ester lubricant having a drop point of 122°–125° F., viscosity of 185 cp at 140° F., specific gravity of 0.921 at 104° F. and refractive index of 1.450 to 1.453 (Henkel, Inc.); 4 weight parts of dibutyltin-bis-octylthioglycollate, 2 weight parts of copper oxalate, 2 weight parts of melamine molybdate, 6 weight parts of a copolymer of ethylene/vinyl acetate (EVA) containing 45% vinyl acetate, and 2 weight parts of MBS containing 20 weight parts each of styrene and methyl methacrylate grafted onto a copolymer of 75 weight parts butadiene-1,3 and 25 weight parts of styrene. To portions of the masterbatch compound was added on a mill, the amounts of titanium dioxide, calcium carbonate and aluminum trihydrate shown in the table. The E-84 smoke density values and fire spread values obtained are set forth in the Table.

TABLE

| ASTM E-84 Smoke and Flame Spread Test Results | | |
|---|---|---|
| Compound | 1 | 2 |
| Masterbatch Additives | | |
| TiO₂ wt. parts | 5 | 9 |
| CaCO₃ wt. parts | 5 | 9 |
| Al(OH)₃ wt. parts | — | 9 |
| Sample thickness - in. | 0.90 | 0.90 |
| Smoke Value - Average (runs) | 596 (6) | 172 (2) |
| Range | 400–836 | 144–199 |
| Flame Spread - Average (runs) | 25 (6) | 12.5 (2) |
| Range | 20–35 | 10–15 |
| Sample thickness - in. | 0.125 | 0.125 |
| Smoke Value - Average (runs) | 485 (5) | 396 (3) |
| Range | 180–705 | 337–449 |
| Flame Spread - Average (runs) | 23 (5) | 16.7 (3) |
| Range | 20–30 | 15–20 |

The compound containing $CaCO_3$, $TiO_2$ and Al(OH)₃ processed satisfactorily and was readily extruded into sheets of 0.90 and 0.125 inch thicknesses. The ductility was satisfactory as measured by the drop dart test (ASTM D-2039). Only two test burns in the tunnel test were required on the 0.90 inch sample because of good reproducibility, particularly as compared to the samples not containing the aluminum trihydrate that shows a much greater range of values obtained and less reproducibility. The flame spread results were 12.5 on a compound of the invention compared to the average value of 25 observed on the sample without aluminum trihydrate. Three burns were made on the 0.125 inch thick sample of this invention and a smoke value of 396 was obtained, as compared to the sample without the aluminum trihydrate that had a value of 485 and was much less reproducible. While compounds containing only titanium dioxide and calcium carbonate have excellent char formation, the char obtained on the burned samples prepared in accordance with this invention provides an even tougher, more protective char layer.

Compositions prepared in accordance with this invention find applications in both housing and transportation where lower smoke formation and flame spread are required and will pass lower smoke density specifications than most PVC compounds now on the market.

I claim:

1. An improved flame resistant low smoke generating vinyl halide polymer composition comprising a vinyl halide polymer, smoke retarding amounts of copper oxalate and an amine molybdate present in amounts from about 1 to 20 total weight parts in a weight ratio of about 1:10 to about 10:1, based on 100 weight parts of polyvinyl chloride, and about five to less than fifteen weight parts each, per one hundred weight parts of vinyl halide polymer, of an alkaline earth metal carbonate, titanium dioxide and aluminum trihydrate.

2. A composition of claim 1 wherein the vinyl halide polymer is a vinyl chloride polymer, the amine molybdate is a melamine molybdate and the alkaline earth metal carbonate is calcium carbonate.

3. A composition of claim 2 wherein the polymer is polyvinyl chloride.

4. A composition of claim 3 wherein the total amount of copper oxalate and melamine molybdate used is a about 2 to 8 weight parts in about equal weight parts of each, and the amount of calcium carbonate, titanium dioxide and aluminum trihydrate used is about 6 to 12 weight parts each.

5. An improved flame resistant low smoke generating vinyl chloride polymer composition comprising a vinyl chloride polymer, smoke retardant amounts of copper oxalate and an amine molybdate present in amounts from about 1 to 20 total weight parts in a weight ratio of about 1:10 to about 10:1, based on 100 weight parts of polyvinyl chloride, about 1 to 10 weight parts per one hundred weight parts of vinyl chloride polymer of a processing aid selected from the group consisting of styrene copolymers and alkyl alkacrylate copolymers, and 3 to 15 weight parts per one hundred weight parts of vinyl chloride polymer of an ethylene vinyl acetate copolymer and a graft polymer of a styrene and alkyl alkacrylate onto a butadiene polymer, and about 5 to 15 weight parts each of an alkaline earth metal carbonate, titanium dioxide and aluminum trihydrate.

6. A composition of claim 5 wherein the vinyl chloride polymer is polyvinyl chloride, the styrene copolymer is a copolymer of a major proportion of styrene with acrylonitrile and the graft polymer is a graft of styrene and methyl methacrylate onto a butadiene-1,3 polymer.

7. A composition of claim 5 wherein the styrene copolymer is a copolymer of a major proportion of styrene with methyl methacrylate.

8. A composition of claim 6 wherein there is about 1 to 10 total weight parts of copper oxalate and amine molybdate and the alkaline earth metal carbonate is calcium carbonate.

9. A composition of claim 8 wherein the amine molybdate is melamine molybdate present in a ratio of 1:10 to 10:1 to copper oxalate, the ratio of ethylene vinyl acetate copolymer to the graft polymer is 2:10 to 10:2, and the calcium carbonate, titanium dioxide and aluminum trihydrate are each present in amounts of about 6 to 12 weight parts.

10. A composition of claim 9 wherein the ethylene-vinyl acetate copolymer contains about 15 to 50 weight percent copolymerized vinyl acetate and the ratio of the copolymer to graft polymer is from 4:8 to 10:2.

* * * * *